United States Patent [19]

Larsson et al.

[11] Patent Number: 5,038,474
[45] Date of Patent: Aug. 13, 1991

[54] DEVICE FOR A CIRCULAR SAW

[75] Inventors: Hakan Larsson, Mölndal; Ove Donnerdal, Partille, both of Sweden

[73] Assignee: Electrolux Motor Aktiebolag, Huskvarna, Sweden

[21] Appl. No.: 496,755

[22] Filed: Mar. 21, 1990

[30] Foreign Application Priority Data

Mar. 30, 1989 [SE] Sweden ............................ 89011050

[51] Int. Cl.⁵ .............................................. B23D 59/02
[52] U.S. Cl. .................................... 30/123.3; 30/389; 125/11.22
[58] Field of Search ...................... 30/123.3, 276, 347, 30/389; 83/100, 168; 125/11.22

[56] References Cited

U.S. PATENT DOCUMENTS

| 3,126,889 | 3/1964 | Blumenfeld | 30/123.3 X |
| 4,333,371 | 6/1982 | Matsuda | 83/169 |
| 4,501,181 | 2/1985 | Yakich | 83/169 |

FOREIGN PATENT DOCUMENTS

| 0036516 | 9/1981 | European Pat. Off. . |
| 949613 | 9/1957 | Fed. Rep. of Germany . |
| 422297 | 3/1982 | Sweden . |
| 438812 | 5/1985 | Sweden . |
| 757311 | 8/1980 | U.S.S.R. . |
| 733223 | 6/1983 | U.S.S.R. . |

Primary Examiner—Z. R. Bilinsky
Attorney, Agent, or Firm—Armstrong, Nikaido, Marmelstein, Kubovcik & Murray

[57] ABSTRACT

A fluid cooling device for a circular saw of centerless type having a ring-shaped saw blade, designed to be rotated about a fictitious center of the saw blade and with at least one disc (8, 108), mounted on the radially inner side of the ring-shaped saw blade. Mounting elements (9, 17) are provided at a rear part of the disc. At least one conduit (20) for a cooling or rinsing agent is provided with an inlet (22) for the conduit in the rear part of the disc and at least one outlet opening (25, 125) in the foremost part of the disc. The outlet opening (25, 125) is located adjacent the periphery of the disc and directed essentially parallel with or with an acute angle relative to a tangent at the interior edge (6) of the blade adjacent the outlet opening.

19 Claims, 8 Drawing Sheets

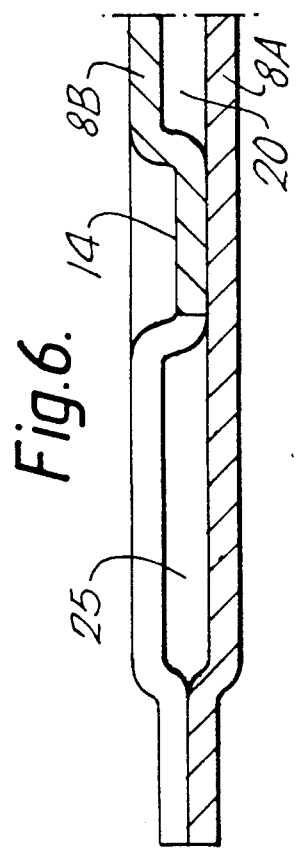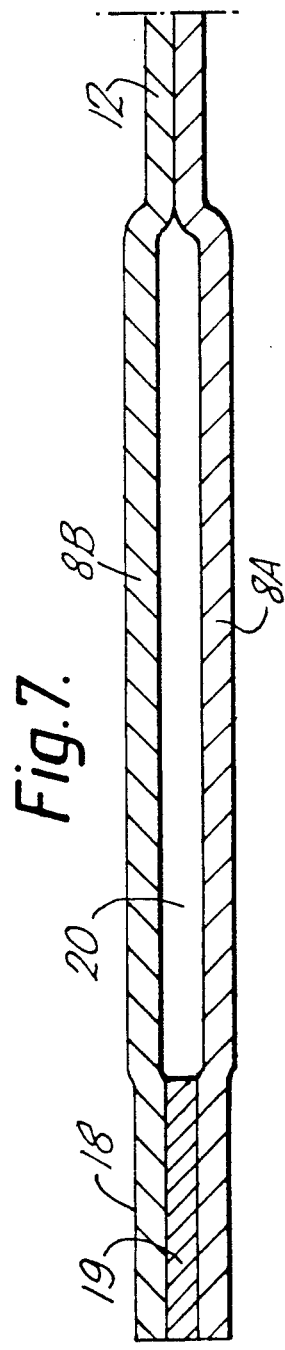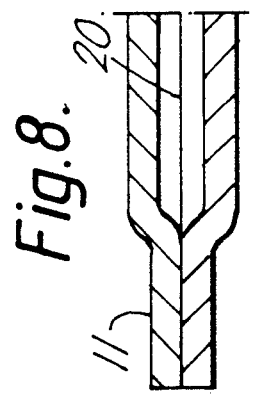

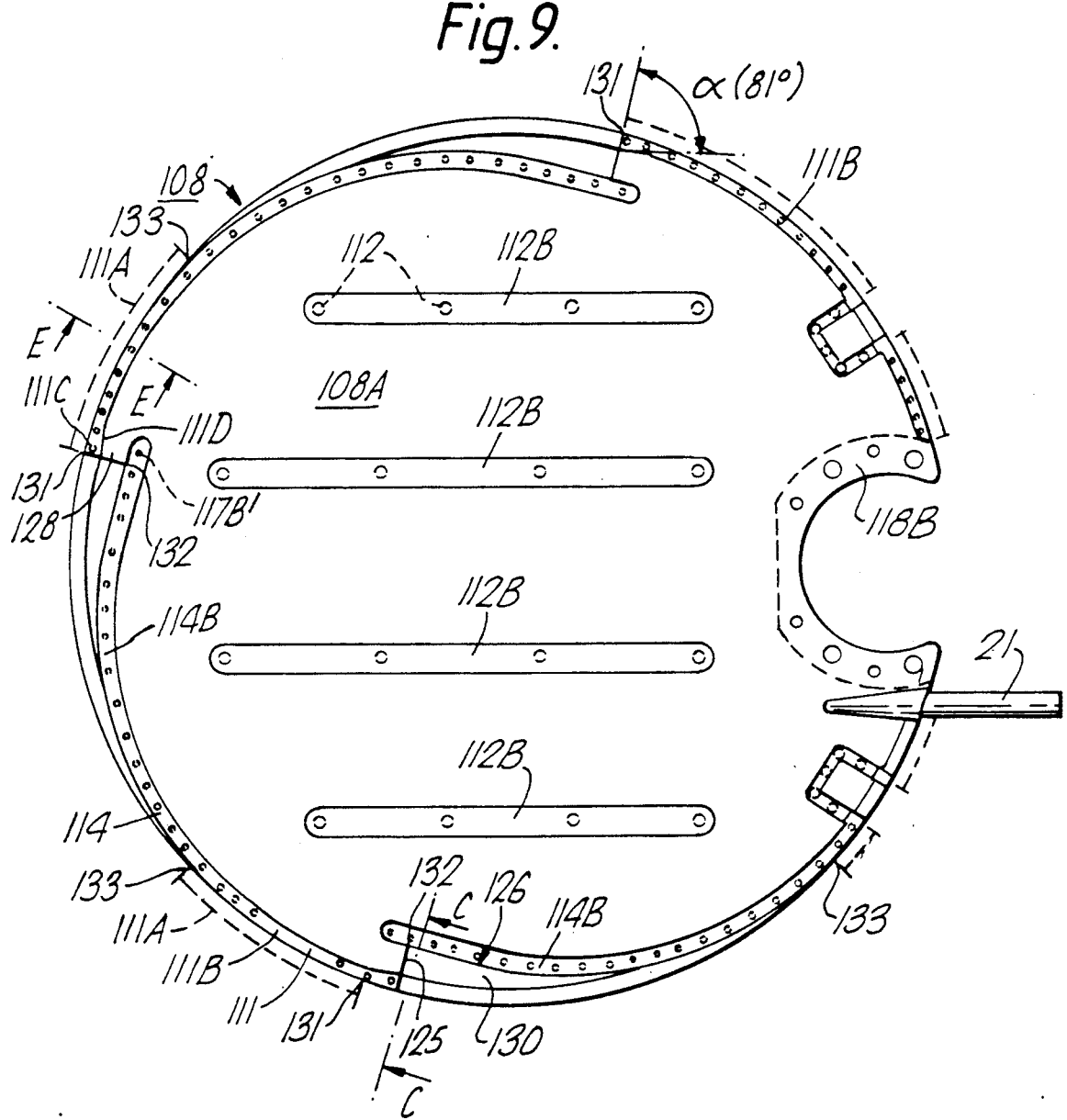

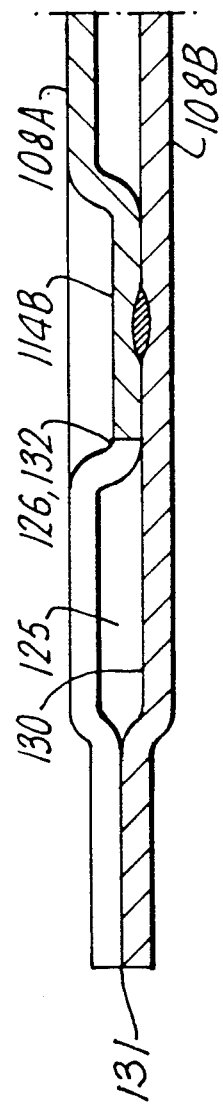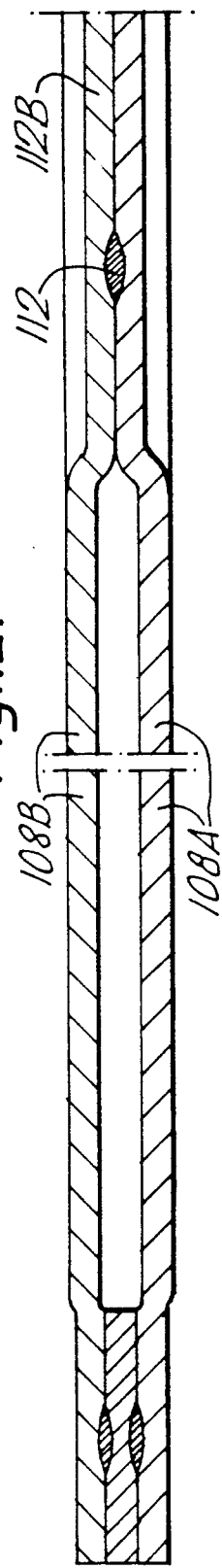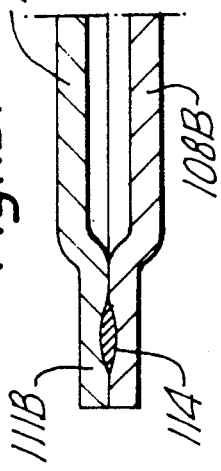

DEVICE FOR A CIRCULAR SAW

TECHNICAL FIELD

The present invention relates to a device for a circular saw of centerless type having a ring-shaped saw blade, designed to rotate about a fictitious center of the saw blade and having at least on disc provided inside the annular saw blade, mounting elements being provided for said disc in its rear part and at least one conduit for a cooling and rinsing agent having an inlet for said conduit in the rear part of the disc and at least one outlet opening in the foremost part of the disc.

STATE OF THE ART

U.S. Pat. No. 4,352,241 relates to devices of the type described above. According to the embodiments described in the patent specification, the conduit for a cooling and rinsing agent ends either in the plane side of the disc or in its edge, the opening being directed essentially radially towards the interior edge of the saw blade. In the first case, the rinsing as well as the cooling effect is particularly poor, since the opening is not directed towards the saw blade. In the latter case, the rinsing and cooling agent does hit the saw blade, but it tends to "splash" from the saw blade without any washing around the same. Thus, no satisfactory rinsing and cooling effect is achieved in this case either. Due to the poor rinsing effect contaminants will follow the saw blade into the driving assembly, and particularly into the groove or grooves in the web of the blade, and result in a pronounced wear of the support rolls of the blade.

BRIEF DISCLOSURE OF THE INVENTION

The object of the present invention is to provide an improved disc, which solves the problems mentioned above, this can be achieved by placing said outlet opening adjacent the periphery of the disc and directing it essentially parallel with or with an acute angle as to the tangent of the interior edge of the saw blade adjacent the outlet opening. The rinsing and cooling agent will in this way be directed mainly along the periphery of the disc, which makes its easier for the liquid to be washed around the blade or, figuratively speaking, "stick" to the same.

Also, the invention makes it possible to guide the rinsing and cooling agent/liquid, to give the same the required direction towards the blade and the proper speed.

This can be achieved, according to a preferred embodiment, by providing the disc outside the outlet opening with a carrying plane or a leading or guide surface, which can guide the water essentially in said tangential direction towards the saw blade.

Another object of the invention is to be able to rinse the saw blade in such a way that it will be essentially free from contaminants in the form of sawdust and the like, before the blade runs into those driving and support rolls, which form part of the driving machinery. This object can be achieved by proper location of said outlet openings for the rinsing agent and by proper design of said carrying planes or leading or guide surfaces.

Further characterizing features of and aspects of as well as advantages of the invention are set forth in the following patent claims and in the following description of preferred embodiments.

BRIEF DESCRIPTION OF THE DRAWINGS

Two embodiments of the invention will now be described, reference being made to the accompanying drawings, in which:

FIGS. 2-8 in more detail show the disc according to the first embodiment of the invention;

FIG. 2 being a planar view of the top side of the disc;

FIG. 3 being a planar view of the bottom side of the disc;

FIG. 4 being a section A—A in FIG. 3 through an inlet for a cooling and rinsing liquid to the interior of the disc;

FIG. 5 being a section B—B in FIG. 2 through a mounting element for the disc;

FIG. 6 being a section C—C in FIG. 2 and showing a front view of an outlet opening for the cooling or rinsing liquid;

FIG. 7 being a section D—D in FIG. 3 through the disc;

FIG. 8 being a section E—E in FIG. 2 through the peripheral part of the disc;

FIGS. 9-13 show a second preferred embodiment of the disc according to the invention;

FIG. 9 being a planar view of the top side of the disc;

FIG. 10 being a planar view of the bottom side of the disc;

FIG. 11 being a section C—C in FIG. 9, showing a front view of the outlet opening for the cooling and rinsing liquid;

FIG. 12 being a section D—D in FIG. 10; and

FIG. 13 being a section E—E in FIG. 9 through the peripheral part of the disc.

DESCRIPTION OF PREFERRED EMBODIMENTS

Figure 1:
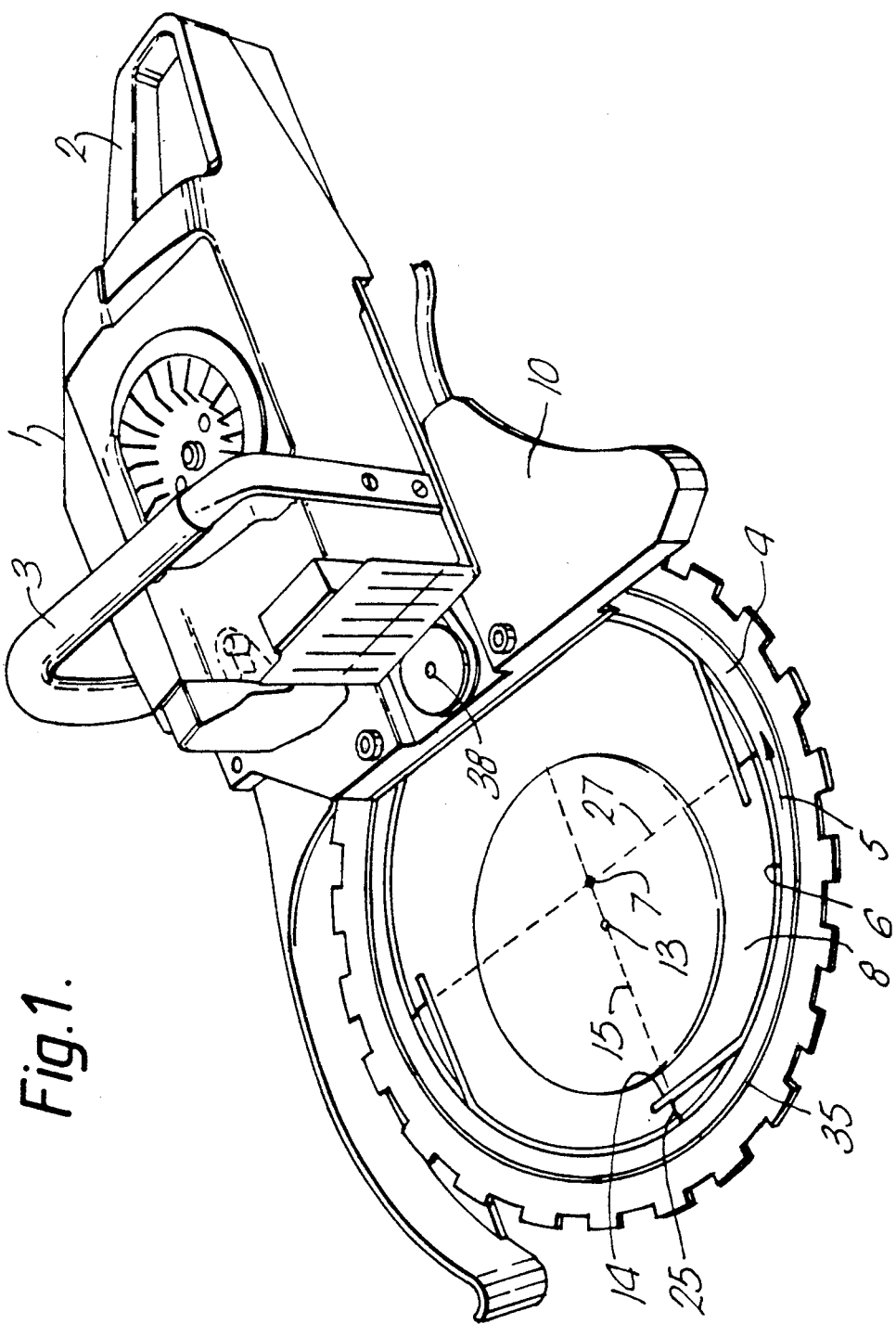
FIG. 1 is a perspective view of a ring-saw having a ring-shaped saw blade and a disc mounted inside said saw blade according to a first embodiment of the invention.

The saw machine shown in FIG. 1 comprises the following main components, i.e. a machine unit 1, which includes a driving motor and transmission means. A motor housing is provided with two handles 2 and 3. A ring-shaped (annular) saw blade 4 is rotatable in the direction shown by arrow 5 by means of said driving and transmission means (not shown). Neither saw blade 4 nor said driving means form part of the present invention. However, the machinery can e.g. be designed as is shown in U.S. Pat. No. 4,472,880.

The interior edge of ring-shaped saw blade 4 is designated 6 and its fictitious center is designated 7.

A disc 8 is provided inside interior edge 6 of blade 4 and at a short radial distance from the same and is plane-parallel with blade 4, and its thickness is essentially the same as the thickness of the blade. Disc 8 is, according to this embodiment, fastened to a unit 10, called a blade holder, which also is designed to hold saw blade 4 in a rotary condition. That part of blade 4 and of disc 8, which is disposed within the area of blade holder 10, is called the rear part of the blade and the disc respectively. Consequently, the remaining parts are called the foremost part of the blade and the disc respectively.

The construction of disc 8 according to the first embodiment is shown in more detail in FIGS. 2-8. Disc 8 comprises an upper sheet 8A and a lower sheet 8B. The two sheets 8A and 8B are welded together through seam-welds 11 along those parts of the periphery of disc 8 which are shown by broken lines 11A in FIG. 2. Also, the two sheets 8A and 8B are welded together through a seam-weld 12 along a circular line 12A, the center 13 of which is somewhat displaced from center 7 of the blade out from the rear part of the disc. Also, the two sheets 8A and 8B are welded together through three seam-welds 14 along lines 14A, which form parts of chords of the circle, which circumscribes disc 8. The middle of the three lines 14A is perpendicular to a diameter 15 of disc 8, which passes through the two centers 7 and 13, while the two other lines 14A are parallel with said diameter 15. Also, the two sheets 8A and 8B are fastened to each other through two seam-welds 16. Each on of seam-welds 16 surrounds a portion 17 of the lower sheet 8B in order to facilitate a removal of guide rolls. Finally, sheets 8A and 8B are sealingly fastened to each other through a weld 18, which also includes an insert 19. In that area, which partly is confined by the peripheral welds 11, 14, 16 and 18 and partly by interior weld 12, the two sheets 8A and 8B are separate from each other, a space 20 being formed, which forms said conduit for a cooling and rinsing agent through disc 8.

An inlet conduit is designated 21. Inlet conduit 21 is connected to an inlet 22, FIG. 4, to space/conduit 20. Three outlet openings are designated 25. Each such outlet opening is formed by cutting or punching out a portion of the peripheral portion of upper sheet 8A. Said portion is confined partly by a first line 15, 27 between a first point 31 on or close to the periphery of the disc and a second point 32 at a radial distance inside said first point a second line 26 along the exterior outline of weld 14 between said second point 32 and a third point 33, which point like first point 31 is situated on or close to the periphery of the disc. The peripheral edge line between the first point 31 and the third point 33 is called the third line. Lines 15 and 27 are diameters of blade 4. Since the first lines 15 and 27 between welds 11 and 14 extend over an area, in which the two sheets 8A and 8b are not fastened to each other, said outlet 25 is formed within this area.

Outlet openings 25 are, as is shown in FIG. 6, designed as a comparatively narrow gap having a width, which corresponds to the distance between welds 11 and 14, and a height, which corresponds to the distance between sheets 8A and 8B in said area between the peripheral and the interior welds, i.e. corresponds to the thickness of space/conduit 20. Consequently, gap-shaped opening 25 extends diametrically in relation to saw blade 4 and consequently is parallel with lines 14A. In order to give the liqued, which flows out through openings 25, a mainly parallell direction in relation to lines 14A, weld 14 with a portion 14' extends also beyond opening 25. The space between weld portion 14' and that part of the exterior weld 11, which is situated radially outside weld portion 14', forms a short outlet conduit 28, which is designed to give the liquid the required direction.

The rinsing and cooling agent, which is fed in through inlet conduit 21 to conduit 20 between the two sheets 8A and 8B, flows out through outlet conduits 28 and outlet openings 25 in a direction, which is mainly parallel to the rotational direction of saw blade 4 in a position exactly in front of the respective outlet opening 25. A certain spread of the liquid, which usually is water, takes place laterally, but roughly a plane jet is obtained, which follows surface 30, which is that portion of lower sheet 8B, which corresponds to the removed portion 26 of upper sheet 8A. Thus, surface 30 works as a carrying plane or guide surface for the jet, which hits interior edge 6 of blade 4 with an acute angle. Thus, when the liquid hits blade 4, its direction and its speed are such, that it will follow the plane side of blade 4, outwards toward the diamond-coated periphery of the blade and provide a satisfactory cooling and rinsing effect.

FIGS. 9-13 show a disc 108, which provides an even greater rinsing and cooling of the ring-shaped saw blade. Also, the disc 108 is designed in such a way that is has a greater rigidity than disc 8, while it offers advantages as far as its manufacturing is concerned. Particularly, with the embodiment according to FIG. 9-13 it is possible to avoid that during the welding tensions arise, which lead to thermal deformation of the disc.

Disc 108 comprises an upper sheet 108A and a lower sheet 10B. Sheets 108A, 108B are like the previous sheets 8A and 8B embossed, before they are welded together to one unit. However, as opposed to sheets 8A and 8B they are not welded together through continuous seam-welding but through spot-welding, which lowers the risk of obtaining tensions inherent in the construction, which may cause the disc to wrap. The maximum thickness of disc 108 is somewhat smaller than the thickness of blade 4.

Along the periphery of disc 108, the two sheets 108A, 108B engage each other in a peripheral zone 111B along those portions of the periphery of disc 108, which are shown by broken lines 111A in FIG. 9. Also, the two sheets engage each other through three identically designed, bent zones 114B, which are continuations of zones 111B and which extend from points 133 on the periphery of disc 108 in a clockwise direction, reference being made to FIG. 9, in an arc, which increasingly is removed from the periphery and which passes point 131, in which the next peripheral zone 111B starts. The concluding end portion of zone 114B is designated 114B'. A point, which forms the limit between zone 114B and its end portion 114B' is designated 132. This point 132 is located radially inside periphery point 131. The two sheets 108A, 108B are welded togeter through spot welds 111 and 114, respectively, in zones 111B and 114B, 114B', respectively. These spot welds are spaced apart at a central distance of about 10 mm.

Also, sheets 108A, 108B are engaging each other at four central straight zones 112B. In each one of zones 112B the two sheets are mutually fastened through four welding points 12.

Also, sheets 108A, 108B are fastened to each other in zones, which correspond to the seam-welds 16 and 18 in the previous embodiment. Consequently, these zones will not be explained in more detail now. However, in these zones the two sheets are also fastened to each other through spot welds rather than seam-welds.

Through a spot welding rather than a seam-welding, a sufficient tightness is obtained. In case a certain leakage of rinsing liquid takes place along the periphery, this can be accepted, and actually it is suitable that at least in that zone which is designates 118B the spot welds are located so far apart, that really a certain leakage is obtained, by means of which a direct rinsing and cooling in the area of the driving rolls of the saw blade is achieved.

Inlet conduit 21 is designed in the same manner as in the previous embodiment.

The embodiment according to FIGS. 9-13 also includes three outlet openings for the rinsing and cooling liquid. These outlet openings are designated 125. Each one of the outlet openings 125 is designated by cutting or punching out a portion 126 of the peripheral portion of upper sheet 108A. Said portion is defined by a straight radial line between points 131 and 132 and by the bent line 126 along the exterior outline of zone 114B between point 132 and point 133. Thus, surface 130 between said lines and the periphery of the disc is a carrying plane or a guide surface for the jet, which leaves outlet opening 25 and corresponds to carrying plane 30 in the previous embodiment, but it is, as is shown, considerably longer and more bent, which is important to the function, which will be explained below. The shape of the carrying plane 130 substantially is a sector of a thin crescent.

Another difference as compared to the previous embodiment is that the peripheral zone 114B, within which the two sheets 108A, 108B are engaging each other along the periphery, widens within a small portion 111C adjacent point 131, i.e. in a small sector close to each one of outlet openings 125. Between each peripheral zone or sector portion 111C and inside that area located portion, 114B', there is an outlet conduit 128, which narrows towards outlet opening 125 due to said widening of peripheral zone portion 111C. The interior edge of peripheral zone portion 111C, designated 111D, is straight and forms an angle α with that line, which extends between points 131 and 132, which angle α is less than 90°, suitably about 80°. The purpose and the result of the designing of peripheral zone portion 111C is to give that water jet, which leaves outlet opening 125, a tendency to be pressed against zone 114B, which proves to be advantageous.

Figure 2:
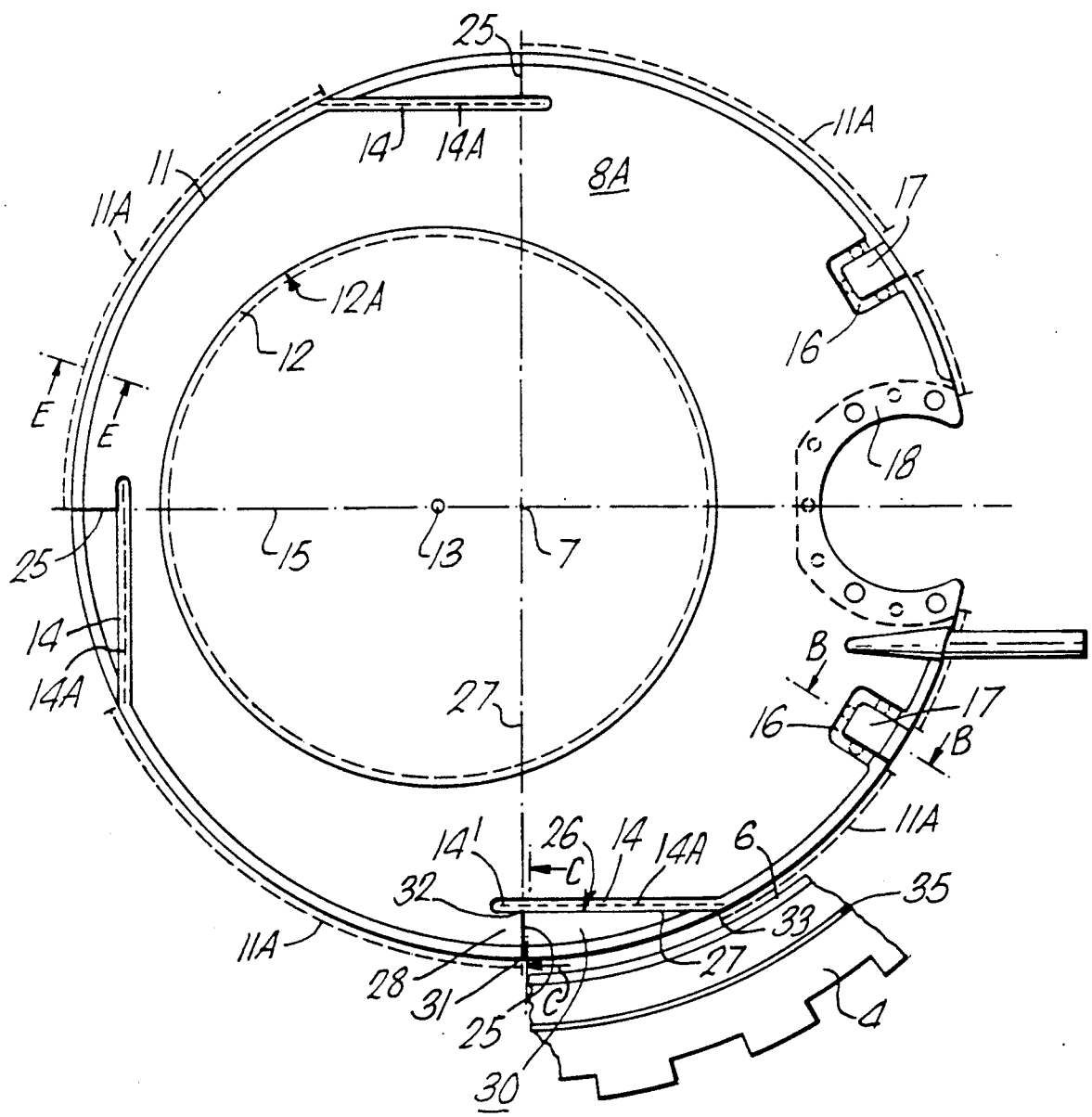
Figure 3:
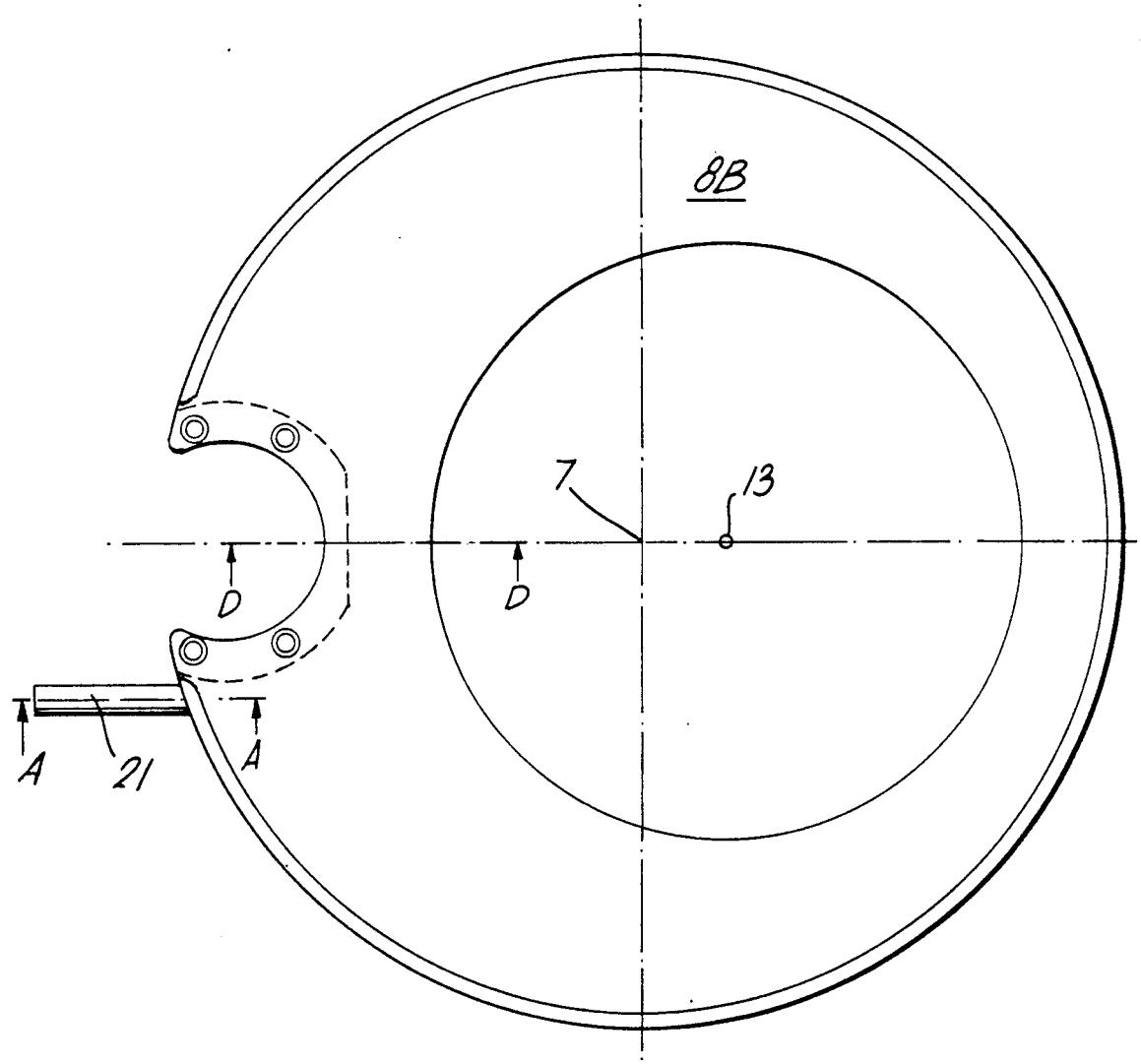
Figure 4:
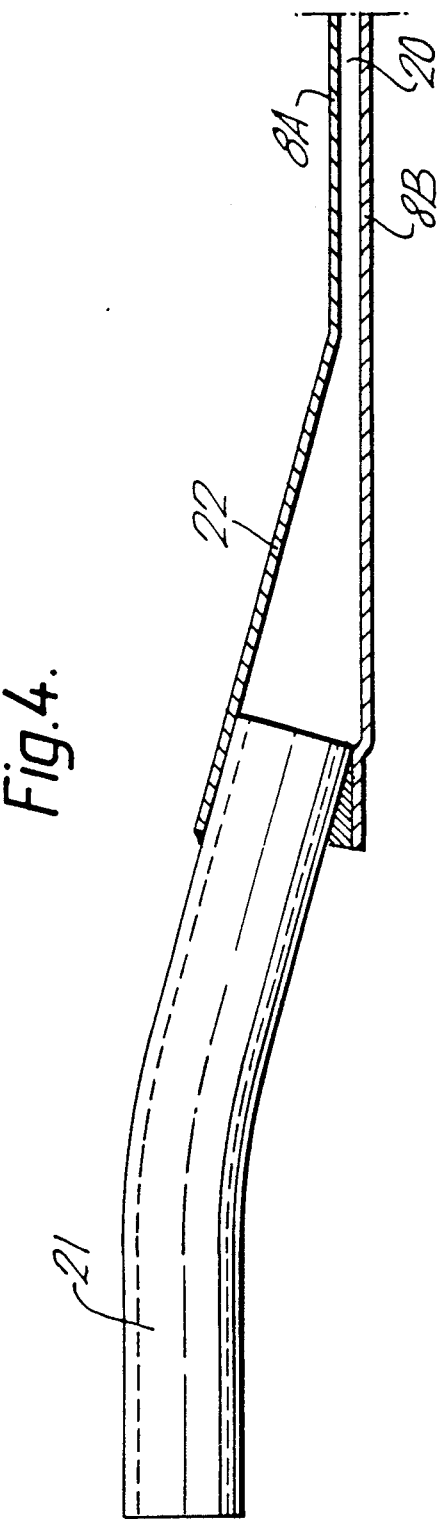
Figure 5:
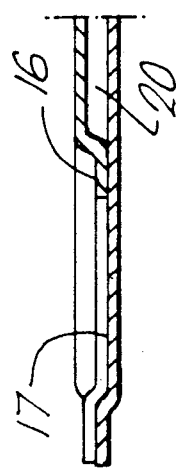
Figure 10:
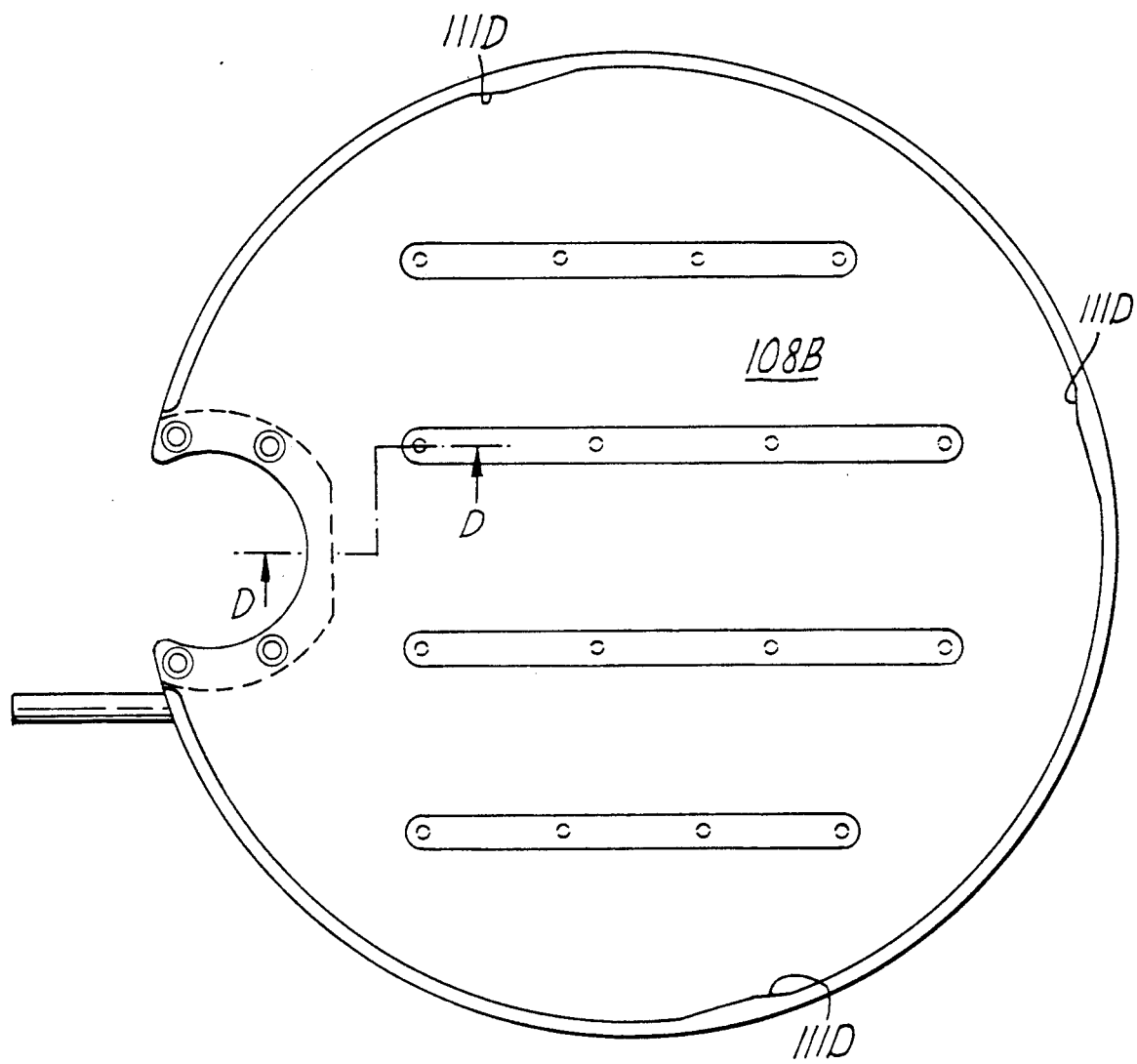

Disc 108, described with reference to FIGS. 9-13, works mainly like the previously described disc 8. However, the latter embodiment offers a few additional effects and important advantages. These advantages are primarily obtained by means of the new design of carrying plane 130 and also of the design of outlet conduits 128 and outlet openings 125. Due to the fact that exterior wall 111D of outlet openings 125 extend obliquely inwards forwards towards outlet opening 125, the rinsing water will leave outlet opening 125 shaped as a plane, well focused jet—"a liquid curtain"—, which is directed towards interior edge 126 of carrying plane 130. The jet is widened gradually along surface 130 but part of the jet follows also edge 126. Thus, along a major part of the periphery of disc 108 between points 131, and all the way to point 133, the rinsing water will be transferred to saw blade 4. In this way a continuous rinsing and cooling of the saw blade is achieved, which is the most efficient. Particularly, the rinsing of the saw blade through the last outlet opening, before the blade enters into the driving machinery, is the most efficient as fas as the removal of all sawdust, also contaminants, from guide groove 35, FIG. 2, is concerned. For this reason, outlet openings 125 have been located somewhat different in relation to the driving machinery; about 20° displaced in a clock-wise direction, reference being made to FIG. 2.

Another advantage of disc 108 is that it does not warp when produced, which is due to the use of spot welding in order to join the two sheets 108A, 108B and also due to the design of the central zones 112B.

The present invention can of course be modified within the scope of the inventive concept. Thus, e.g. all of the outlet openings do not have to be placed on the same side of the disc. Also, the number can be fewer or larger than three. Also, the outlet openings do not have to be directed in parallel with the tangent of the interior edge of the blade adjacent the opening. Thus, it is entirely feasible to tilt the openings somewhat in order to let the holes form a positive or negative acute angle with the first tangent. Also, it is possible to fasten the two sheets, which form the disc, in another way then through seam-welding or spot-welding. Thus, a joining by means of gluing, soldering and/or folding also are feasible methods.

What is claimed is:

1. A fluid cooling device having an outer peripheral edge for rotatably supporting a radially inner edge of a ring-shaped saw blade comprising:
   a disc having a circular outer peripheral edge and fluid conduit,
   means at a rear part of said disc for mounting said disc to a support, and
   a fluid inlet and at least one fluid outlet opening for said fluid conduit, said fluid inlet being located at said rear part of said disc and said fluid outlet opening being adjacent said outer peripheral edge at a foremost part of said disc and directed substantially tangentially in a direction of rotation of a ring-shaped saw blade to be mounted to said outer peripheral edge of said disc.

2. A fluid cooling device according to claim 1, wherein said outlet opening extends along a first line (15,27) from a first point (31, 131) on or close to the outer peripheral edge of the disc to a second point (31, 132) spaced at a distance radially inward from the outer peripheral edge of the disc.

3. A fluid cooling device as defined by claim 1 wherein said fluid outlet opening is directed substantially parallel to a tangent to said outer peripheral edge of said disc adjacent said outlet opening.

4. A fluid cooling device as defined by claim 1 wherein said disc has a carrying plane outside said fluid outlet opening for leading a cooling fluid from said outlet opening in said substantially tengential direction toward said outer peripheral edge of said disc.

5. A fluid cooling device according to claim 4, wherein said disc is formed by a first member joined to a second member, said fluid conduit is a space between two interfacing walls of said first and second members, said outlet opening and said carrying plane are formed by one of the two walls in an area confined by a first line between a first point at said outer periphery and a second point radially inward from said first point, a second line (26, 126) between said second point and a third point (33,133), which is located on or close to the periphery of the disc, and a third line along the periphery of the disc between said first point and third point, and the space between the two walls of the disc is functionally sealed in the area adjacent to said second line.

6. A fluid cooling device according to claim, 5 wherein said second line (26) is a straight line and said carrying plane is substantially in the form of a triangle.

7. A fluid cooling device according to claim 5, wherein said carrying plane (130) is substantially in the form of a sector of a thin crescent with said second line (126) being bent and forming an interior edge of said crescent.

8. A fluid cooling device according to claim 7, wherein said carrying plane extends along a sector of the periphery of the disc, which corresponds to a central angle of between 30° and 30°.

9. A fluid cooling device according to claim 5, wherein a portion (14', 114') of the seal along said second line extends rearwards beyond said first line, an outlet conduit (28) being formed behind the outlet opening, which extends in the same direction as the fluid outlet opening, and said outlet conduit, is partly confined in a radial direction by said rear portion (14', 114') along said second line and partly by a sealed outer periphery (11,111) of the disc.

10. A fluid cooling device according to claim 9, wherein a peripheral outer edge seal zone is increasingly wider in a portion (111C) adjacent the outlet conduit (128), and the outlet conduit converges towards the outlet opening (125), to direct fluid leaving the outlet opening against said second line (126).

11. A fluid cooling device according to claim 1, wherein a plurality of fluid outlet openings (25, 125) are arranged along the outer periphery of the disc in the foremost part of the disc.

12. A fluid cooling device according to claim 11, characterized by three outlet openings (25, 125).

13. A fluid cooling device as defined by claim 1 or claim 4, wherein said disc is formed by a first member joined to a second member, an interior space is provided between interfacing walls of said first and second members, and said interior space comprises said fluid conduit.

14. A power saw of the type including a annular saw blade having a radially inner edge rotatably supported by an outer peripheral edge of a disc and providing a sawing depth greater than a radius of the saw blade, wherein the improvement comprises:
 a disc having a fluid conduit,
 means at a rear part of said disc for mounting said disc to a support providing means for rotating said blade,
 a fluid inlet for said fluid conduit, said fluid inlet being located at said rear part of said disc, and
 at least one fluid outlet for said fluid conduit, said fluid outlet being located adjacent said outer peripheral edge of said disc at a foremost part of said disc and directed substantially tengentially relative to said radially inner edge of said saw blade to direct a flow of fluid substantially tangentially toward said radially inner edge of said saw blade.

15. A power saw according to claim 14, wherein said disc is formed by a first member joined to a second member, said fluid conduit is a space between two interfacing walls of said first and second members, said outlet opening and a carrying plane are formed by one of the two walls in an area confined by a first line between a first point at said outer peripheral edge and a second point radially inward from said first point, a second line (26, 126) between said second point and a third point (33,133), which is located on or close to the outer peripheral edge of said disc, and a third line along the outer peripheral edge of the disc between said first point and third point, and the space between the two walls of the disc is functionally sealed in the area adjacent to said second line.

16. A power saw according to claim 15, wherein said carrying plane (130) is substantially in the form of a sector of a thin crescent with said second line (126) being bent and forming an interior edge of said crescent.

17. A power saw according to claim 15, wherein a portion (14', 114') of the seal along said second line extends rearwards beyond said first line, an outlet conduit (28) being formed behind the outlet opening, which extends in the same directions as the fluid opening, and said outlet conduit, is partly confined in a radial direction by said rear portion (14', 114') along said second line and partly by a sealed outer periphery (11,111) of the disc.

18. A power saw according to claim 17, wherein a peripheral outer edge seal zone is increasingly wider in a portion (111C) adjacent the outlet conduit (128), and the outlet conduit converges towards the outlet opening (125), to direct fluid leaving the outlet opening against said second line (126).

19. A power saw according to claim 14, wherein a plurality of fluid outlet openings (25, 125) are spaced along the outer peripheral edge of the disc at said foremost part of said disc.

* * * * *